J. R. MOFFITT.
Grain Separator.
No. 717.
Reissued May 17, 1859.
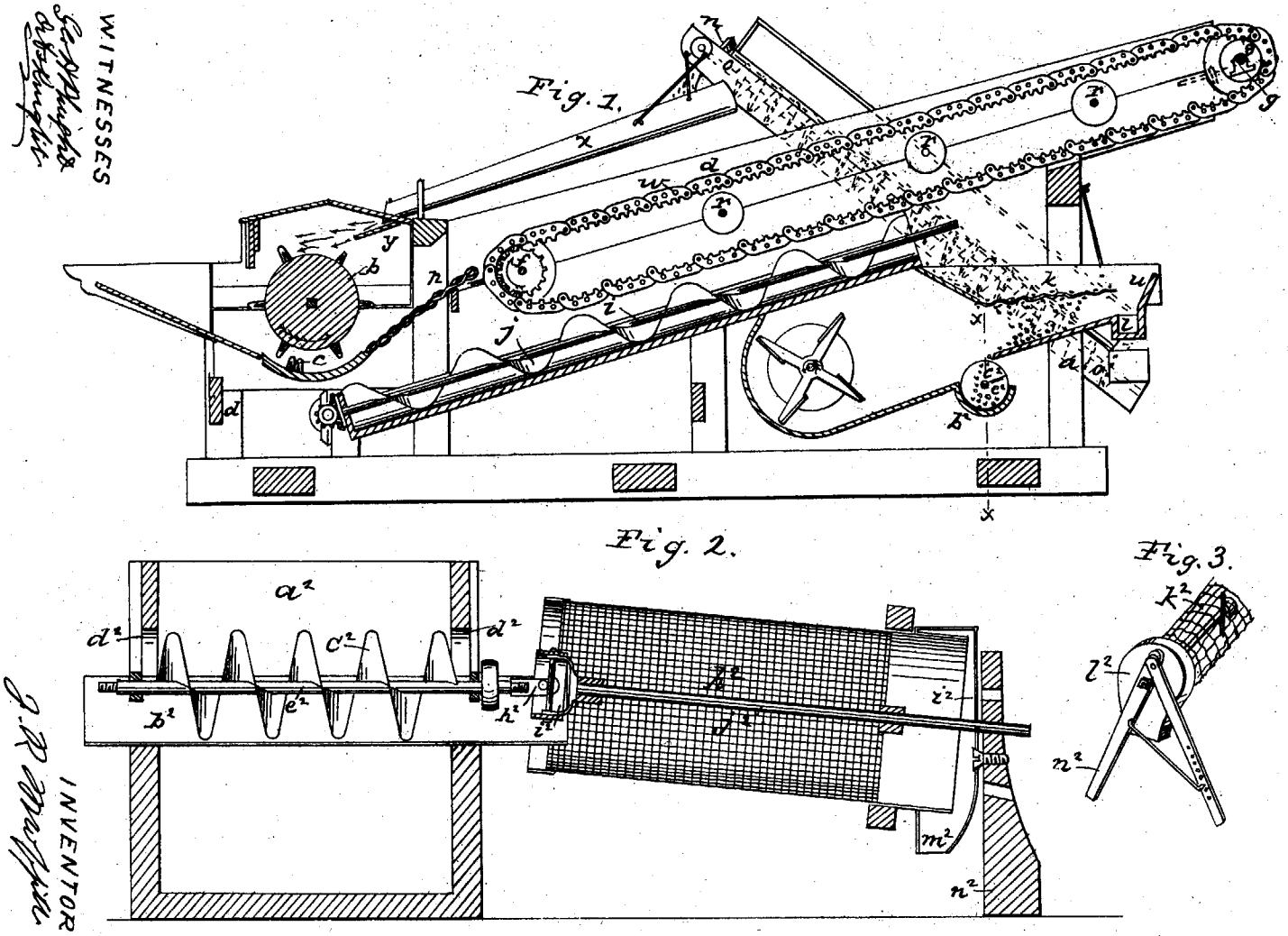
WITNESSES
Geo. D. Phillips
O. Bolenight
INVENTOR
J. R. Moffitt
N. PETERS. Photo-Lithographer, Washington, D. C.

UNITED STATES PATENT OFFICE.

JOHN R. MOFFITT, OF PIQUA, OHIO.

IMPROVEMENT IN GRAIN-SEPARATORS.

Specification forming part of Letters Patent No. 9,432, dated November 30, 1852; Reissue No. 540, dated March 23, 1858; Reissue No. 717, dated May 17, 1859.

*To all whom it may concern:*

Be it known that I, JOHN R. MOFFITT, of Piqua, Miami county, Ohio, have invented new and useful Improvements in Grain-Separators; and I hereby declare the following to be a full and exact description of the same, reference being had to the accompanying drawings, making part of this specification.

The subject of my invention is the attachment or appendage to a thrashing-machine of a screen and spout, which, while deriving motion and being fed from the conveyer or other part of the shoe or "mill," is isolated from its winnowing action, and can be made to discharge on either side of the machine.

In the customary mill or winnowing apparatus as adapted to thrashing-machines the action of the shoe screen working in conjunction with a blast fails to separate those parts of the refuse which are of nearly equal weight with the grain, because a strength of draft that would blow them away would also remove the grain itself. Hence it has been customary to convey grain (thus intermixed) from the thrasher and winnower to an entirely distinct and separate mill. By my arrangement the screening apparatus is so connected to and operated by the shoe proper as to receive grain automatically and continuously therefrom, and so as to operate apart from the action of the blast, so that the grain before its final delivery from the machine is separated from such extraneous matters as sticks, white caps, rat droppings, chess, &c., which, being of nearly equal specific gravity with the grain itself, cannot be separated within the narrow limits of the winnowing apparatus of a thrashing-machine.

Thrashing and separating machines are often operated in the open air, and sometimes, from the nature of the location, at other times from the direction of the wind, the discharge of the grain is impracticable on one side. In order to provide against this contingency, I have arranged my screen so as to be operated with equal facility on either side.

In the annexed drawings of a machine embodying my improvements, Figure 1 is a longitudinal section through the machine. Fig. 2 is a transverse section through a portion of the winnowing apparatus, together with an axial section of the screen, taken at the line $x$ $x$, Fig. 1. Fig. 3 is a perspective view of one form of trestle.

$a^2$ is a portion of the delivery end of the box or case of a thrashing-machine.

$b^2$ is a semi-cylindrical trough, open at both ends, and extending from side to side of the box, and projecting somewhat beyond each side of it. Hung concentrically within the trough is a spiral conveyer, $c^2$, journaled to bearings $d^2$, suspended from the box. The shaft $e^2$ of this conveyer carries a pulley, $f^2$, by which it is rotated. Each end of the shaft is screw-threaded at $g'$ $g''$, so as for one end or the other to have fastened to it the stock $h^2$ of the swivel-head $i^2$ of a shaft, $j^2$, belonging to a revolving cylindrical screen, $k^2$, the mouth of which is made to inclose the outlet of the trough.

$l^2$ is a hood which incloses the discharging end of the screen and narrows to an open spout, $m^2$, at bottom.

$n^2$ is a standard or trestle which affords journal-bearing for the outer extremity of the screen-shaft, and supports also the hood or spout $l^2$. This standard may be pierced in different places, or may be formed as in Fig. 3, so as to enable the adjustment of the screen to different angles of inclination, according to the nature of the material and the kind of work to be done. Thus, if there is a large admixture of chess or other foreign matters, the screen will require to approach a horizontal position, and if the reverse be the case, the screen may be put at a steep inclination, so as to expedite the delivery of the grain.

The conveyer and screen being placed in continuity and operated by one common pulley, not only renders compact and simplifies the apparatus, but presents no interval for entrance of chaff or other extraneous matters, so that a bag attached to the spout of the hood hood will receive the grain clean.

I do not propose to confine myself to the precise construction or arrangement here specified so long as the essential objects of my invention are attained by equivalent means

I claim—

The reversible screen $k^2$ and delivery-spout $l^2 m^2$, arranged, adapted, and constructed substantially in the manner described, with and to the discharging-spout of the "fanning-mill" or "shoe" of a thrashing machine, so as to be isolated from the winnowing arrangement and made to deliver at either one side or the other of the machine, as set forth.

In testimony of which invention I hereunto set my hand.

Witnesses: J. R. MOFFITT.

GEO. H. KNIGHT,

OCTS. KNIGHT.